US008028903B1

(12) United States Patent
Daniel

(10) Patent No.: US 8,028,903 B1
(45) Date of Patent: Oct. 4, 2011

(54) SYSTEM AND METHOD OF PRE-APPROVING CARD HOLDERS FOR EXPEDITED SECURITY PROCESSING USING EMERGING COUNTRIES INTERNATIONAL TRAVEL APPROVAL CONTROL CARD

(75) Inventor: Isaac S. Daniel, Miramar, FL (US)

(73) Assignee: F3M3 Companies, Inc., Miramar, FL (US)

( * ) Notice: Subject to any disclaimer, the term of this patent is extended or adjusted under 35 U.S.C. 154(b) by 0 days.

(21) Appl. No.: 12/761,208

(22) Filed: Apr. 15, 2010

Related U.S. Application Data

(63) Continuation-in-part of application No. 12/584,375, filed on Sep. 4, 2009, and a continuation-in-part of application No. 12/626,841, filed on Nov. 27, 2009, now Pat. No. 7,950,577, and a continuation-in-part of application No. 12/730,990, filed on Mar. 24, 2010.

(60) Provisional application No. 61/277,989, filed on Sep. 29, 2009.

(51) Int. Cl.
*G06K 5/00* (2006.01)

(52) U.S. Cl. ........ 235/380; 235/382; 235/379; 235/385; 705/5

(58) Field of Classification Search ............... 235/380, 235/382, 379, 385; 705/5
See application file for complete search history.

(56) References Cited

U.S. PATENT DOCUMENTS

| 6,094,640 | A * | 7/2000 | Goheen | 705/5 |
| 6,776,332 | B2 | 8/2004 | Allen et al. | |
| 2001/0016825 | A1 * | 8/2001 | Pugliese et al. | 705/5 |
| 2003/0085808 | A1 * | 5/2003 | Goldberg | 340/531 |
| 2003/0149343 | A1 * | 8/2003 | Siegel et al. | 600/300 |
| 2004/0035928 | A1 * | 2/2004 | Anderson | 235/385 |
| 2005/0083171 | A1 * | 4/2005 | Hamilton | 340/5.7 |
| 2007/0290879 | A1 * | 12/2007 | Tuttle | 340/825.49 |
| 2008/0281740 | A1 * | 11/2008 | Wu | 705/35 |
| 2009/0176559 | A1 * | 7/2009 | Buchholz et al. | 463/25 |
| 2009/0313129 | A1 * | 12/2009 | Rothschild | 705/17 |
| 2010/0023400 | A1 * | 1/2010 | DeWitt | 705/14.53 |
| 2010/0135524 | A1 * | 6/2010 | Durst et al. | 382/100 |

FOREIGN PATENT DOCUMENTS

WO    WO 2004/059586    7/2004

* cited by examiner

*Primary Examiner* — Allyson Trail
(74) *Attorney, Agent, or Firm* — Carol N. Green, Esq.

(57) ABSTRACT

The present disclosure relates generally to a system and method, and more particularly to a system and method of pre-approving card holders for expedited security processing using an emerging country's international travel approval control card, i.e. an electronic data card that includes biometric verification means for verifying a biometric identifier stored thereon, used to uniquely identify the card holder to security personnel as pre-approved for expedited security screening at a country's port of entry.

3 Claims, 12 Drawing Sheets

SYSTEM AND METHOD OF PRE-APPROVING CARD HOLDERS FOR EXPEDITED SECURITY PROCESSING USING EMERGING COUNTRIES INTERNATIONAL TRAVEL APPROVAL CONTROL CARD

PRIORITY CLAIM

This patent application is a continuation in part of, and claims priority to U.S. Non-Provisional patent application Ser. No. 12/584,375 titled An Apparatus, System And Method For Storing Visa application information filed Sep. 4, 2009 and the U.S. Provisional Patent Application Ser. No. 61/277,989 titled A Method Of Processing An Immigration Customs Visa Card filed on Sep. 28, 2009; U.S. Non-Provisional patent application Ser. No. 12/626,841 titled An Apparatus, System And Method For Verifying Authorized Entry Using An Immigration Customs Visa Card filed Nov. 27, 2009; and U.S. Non-Provisional patent application Ser. No. 12/730,990 titled System And Method Of Pre-Approving Applicants For Visa Processing Using An Emerging Country's International Travel Approval Control Card filed Mar. 24, 2010. The entire disclosures of the afore-mentioned applications are incorporated by reference as if fully stated herein.

FIELD OF THE INVENTION

The present disclosure relates generally to a system and method, and more particularly to a system and method of pre-approving card holders for expedited security processing using an emerging country's international travel approval control card, i.e. an electronic data card that includes biometric verification means for verifying a biometric identifier stored thereon, used to uniquely identify the card holder to security personnel as pre-approved for expedited security screening at a country's port of entry.

BACKGROUND OF THE INVENTION

In the wake of the terrorist attacks of Sep. 11, 2001 many developed countries have implemented new security measures with more stringent rules in an effort to minimize and/or eliminate the threat of terrorism within their country's borders. Central to these security measures is increased screening at airports and/or other ports of entry. Although necessary, airport security screening impacts everyone, terrorists, non-terrorists, domestic and international travelers alike, as all individuals boarding airplanes, i.e. pilots, other crew members and passengers, must undergo metal detector screening, and in some instances remove one or more articles of clothing, e.g. belts, shoes, etc., prior to gaining access to the boarding gates for flight departures. Additionally, each individual is verified against a "No-Fly" list of known or suspected terrorists or persons who are a flight and/or security risk. Many travelers consider airport security screening a necessary evil, but would otherwise prefer a less intrusive method of conveying their non-terrorist status to security personnel. Thus, there is a need for a system and method for providing proper authentication and less intrusive airport security screening for travelers who are not a flight and/or security risk, without compromising security measures.

Another immigration concern for developed countries is finding a way to effectively document illegal aliens who are out of status and/or foreigners who extend their stay beyond their visas. Currently, there are no requirements for immigrants or visitors to update their address information to the immigration authorities once they have gained access into the country. In reality, immigrants often change addresses moving to different cities or even different states, without ever thinking of apprising immigration and customs authorities of the change. Although, immigration authorities would prefer documenting that information, the sheer volume of illegal aliens and out of status foreigners makes it extremely difficult. Thus, there is a need for the immigration authorities to be able to track immigrants, both legal and illegal in a manner that is efficient and cost effective.

Accordingly, the various embodiments and disclosures described herein satisfies these long felt needs and solves the limitations of the prior art in a new and novel manner.

SUMMARY OF THE INVENTION

An objective of the system and method disclosed herein is to provide an emerging country's international travel approval control ("ECITAC") card, (also referred to herein as an "electronic data card") that includes biometric verification means positioned thereon for receiving and storing a biometric identifier used as a unique identifier of the card holder.

Yet another objective of the invention is to provide a system and method of expediting the processing of approved travelers whose identity and security clearance status have been verified via processing of the ECITAC card.

Still yet another objective is to provide a system and method for identifying individuals who are on an approved flying list for expedited security screening at a port of entry.

An objective of the invention is to provide an early alert system and method of alerting the appropriate authorities of any unexplained discrepancies between an individual's travel itinerary and his/her actual arrival time at a port of entry.

Yet another objective of the invention is to provide a system and method of identifying potential security threats based on an individual's conformance to his/her travel itinerary.

Still yet another objective of the invention is to allow immigrants, both visitors and/or permanent residents to conveniently update their address and contact information within a predetermined time for ease of tracking their immigration status.

System and method includes an ECITAC card, i.e. an electronic data card, which is a functional component of a system, where the system and method comprises of: providing an electronic data card configured for electronically storing thereon a card holder's travel itinerary or a biometric identifier; and providing a card reader connected to a computer, wherein the card reader is configured for receiving the card holder's travel itinerary or security clearance stored on the electronic data card. The method further comprises of communicating with a card reader or computer in any one of the following manner: wirelessly or wired.

Travel itinerary may include but is not limited to: surname, given names, card holder's picture, personal contact information, departing airline carrier, arriving airline carrier, flight information, departing flight number, arriving flight number, departure boarding gate, arrival gate, departing city, arrival city, departure date, arrival date, return date, port of entry, scheduled arrival time, actual arrival time, arrival time at a port of entry, departure time at a port of entry, arrival terminal, departure terminal, current location, flight status notification, passport information and the like. Passport information as used herein includes but is not limited to: pre-approved status for visa, photograph, issuing country, passport number, surname, given names, address, nationality, date of birth, place of birth, gender, race, height, color of eyes, passport number, date of issue, passport expiration date, occupation, place of issue, authority or endorsement, contact information, current visa information (if applicable), type of visa and such other passport information that are known and used in the arts.

In some embodiments, system and method further comprises of providing biometric verification means positioned within the electronic data card, where the biometric verification means is configured for validating a biometric sample by comparing the biometric sample with the biometric identifier stored thereon. Biometric verification means includes but is not limited to: fingerprint recognition means, hand geometry recognition means, palm geometry recognition means, iris recognition means, retina recognition means, and speech recognition means.

In some embodiments, system and method includes providing a kiosk adapted to include at least one card reader. Kiosk may also be adapted to include biometric verification means positioned thereon for authenticating at least one electronic data card holder's identity, as well as displaying select travel itinerary information, where the computer processor activates the kiosks' displaying means for displaying select travel itinerary information.

System and method further comprises reviewing the card holder's security clearance status for expedited security screening. The electronic data card is configured for any one or more of the following: being accessed by an application program executable on the computer; or transmitting through the application program at least one travel itinerary or security clearance.

System and method also include receiving at least one electronic data card holder's travel itinerary remotely from a kiosk adapted to include a card reader connected to a computer, wherein the card reader is configured for receiving the card holder's travel itinerary from the electronic data card; and transmitting the at least one travel itinerary to a destination port or reviewing the card holder's security clearance status for expedited security screening.

In some embodiments, system comprises: a computer; an electronic data card configured for electronically storing thereon at least one card holder's travel itinerary or security clearance; and a card reader connected to the computer, wherein the card reader is configured for receiving at least one card holder's travel itinerary or security clearance stored on the electronic data card. The electronic data card communicates with a card reader or computer in any one of the following manner: wirelessly or wired.

System and method may include software components like an application program for transmitting the at least one travel itinerary to another port of entry. The electronic data card is configured for any one or more of the following: being accessed by an application program executable on the computer; or transmitting through the application program at least one travel itinerary or security clearance.

System may also comprise of a card reader connected to a computer, wherein the card reader is configured for receiving an electronic data card holder's travel itinerary or security clearance from an electronic data card; and computer executable code executable on the computer and operative to perform any one or more of the following: controlling the card reader to read the electronic data card; receiving a biometric sample used to verify the identity of the card holder; verifying the card holder's biometric sample with the biometric identifier; reviewing a card holder's security clearance to determine the electronic data card holder's pre-approval status for expedited security screening; activating displaying means; transmitting at least one travel itinerary to another port of entry; extending an electronic data card's validation based on receiving a card holder's select travel itinerary, e.g. contact information; or suspending an electronic data card's validation based on failing to receive card holder's a card holder's select travel itinerary, e.g. contact information.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the system and method may be derived by referring to the detailed description and claims when considered in connection with the Figures, wherein like reference numbers refer to similar items throughout the Figures.

DETAILED DESCRIPTION OF THE PREFERRED EMBODIMENT

System Level Overview

Figure 1A:
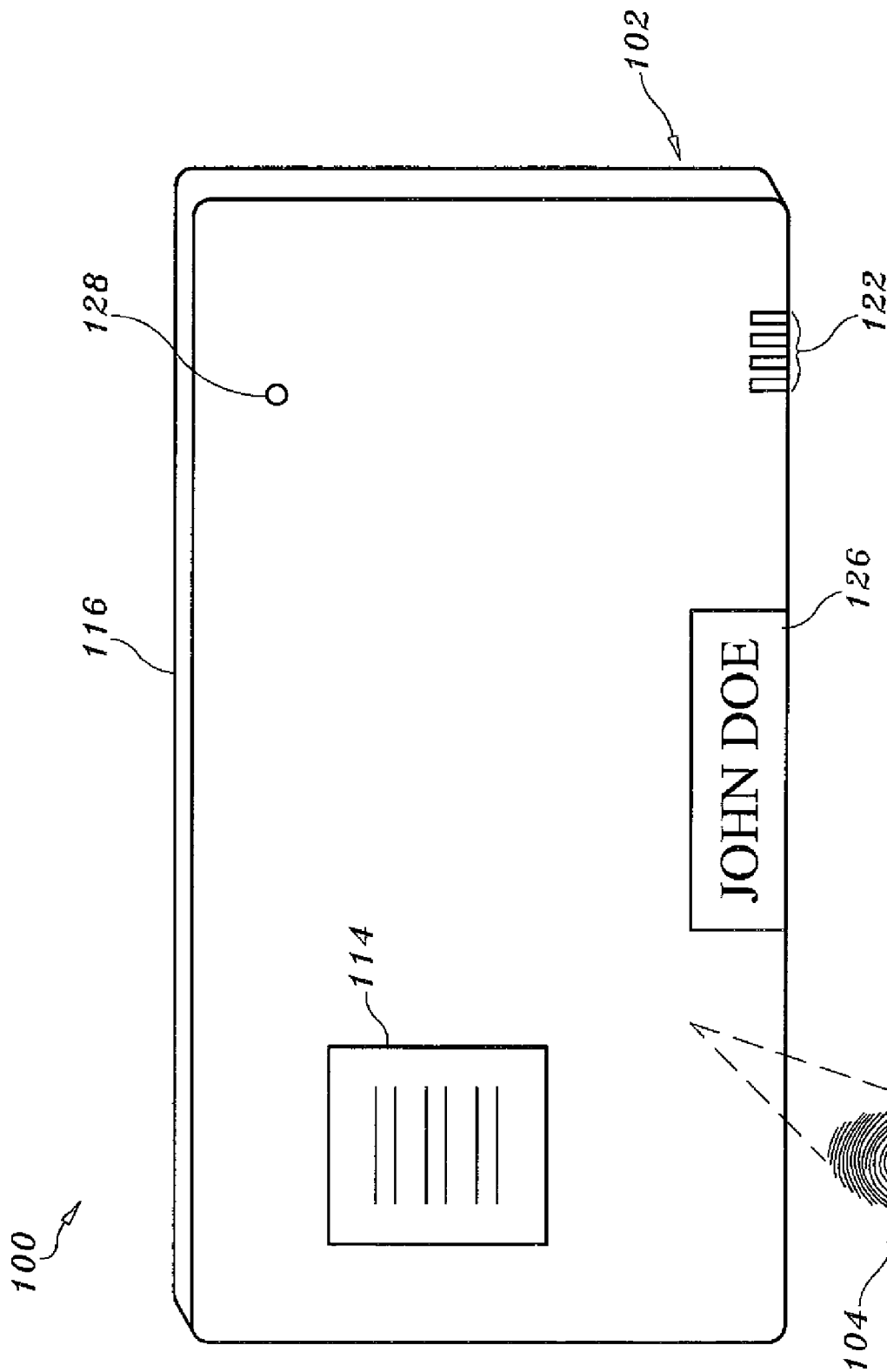
FIG. 1A is an exemplary embodiment of the ECITAC card.

The following discussion describes in detail, varied embodiments of the system and methods disclosed herein.

However, this discussion should not be construed, as limiting the invention to those particular embodiments, as practitioners skilled in the art will appreciate that the system may vary as to configuration and as to details of the parts, and that a method may vary as to the specific steps and sequence, without departing from the basic concepts disclosed herein. Similarly, the elements described herein may be implemented separately, or in various combinations without departing from the teachings of the present invention. Turning now descriptively to the drawings, in which similar reference characters denote similar elements throughout the various views.

Figure 1B:
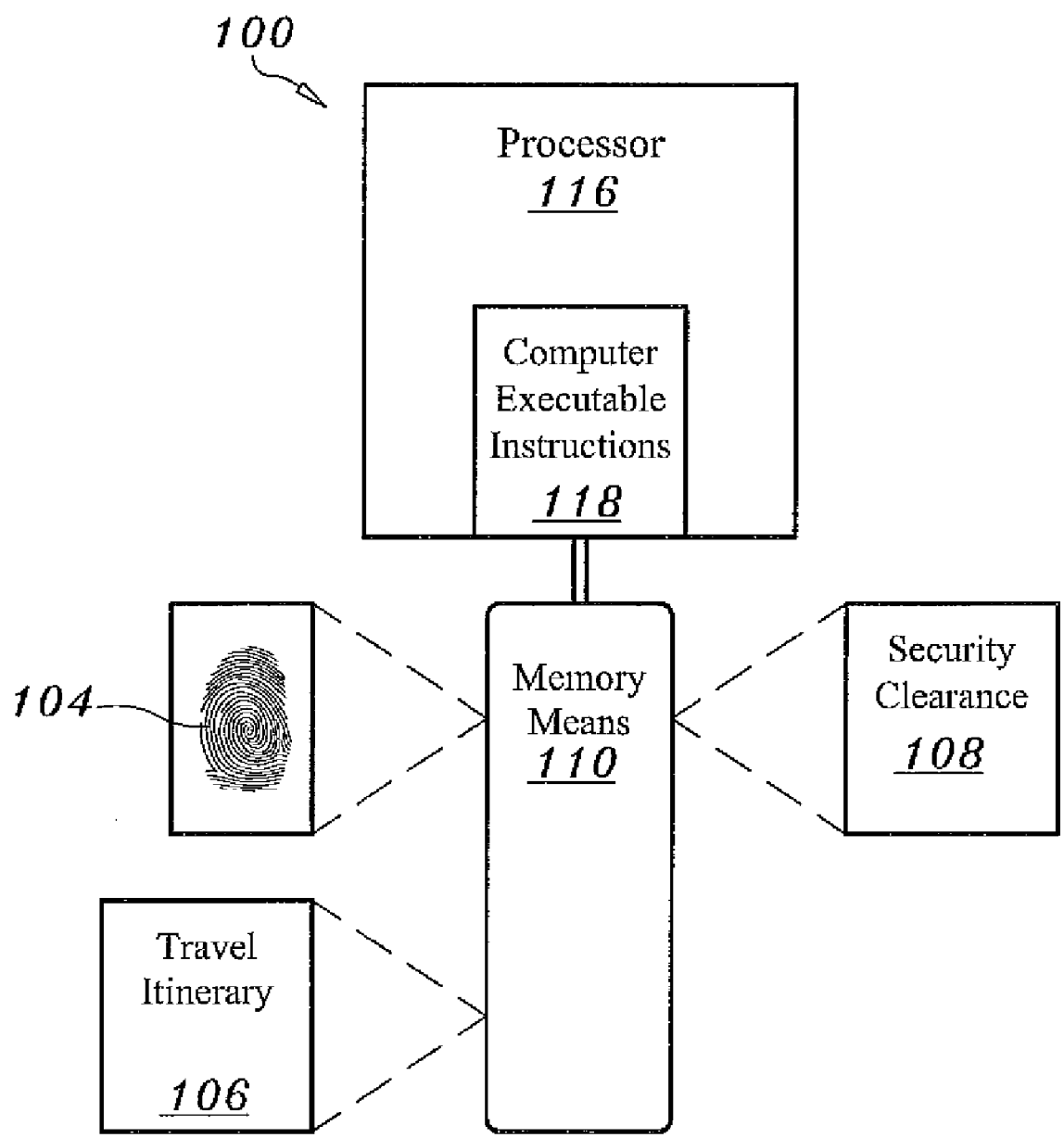
FIG. 1B is an exemplary embodiment of the ECITAC card.
Figure 1C:
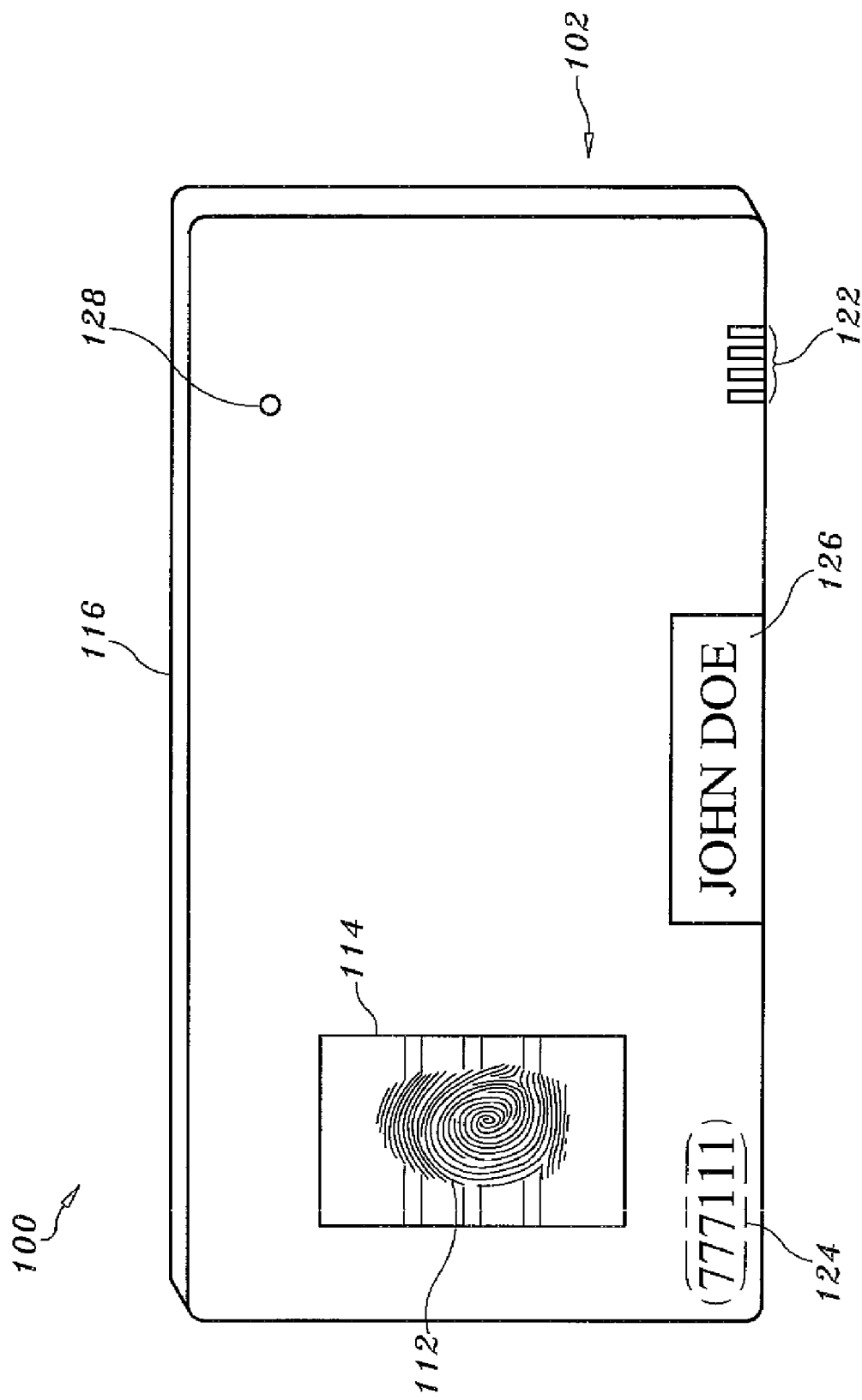
FIG. 1C is an exemplary embodiment of the ECITAC card.

FIGS. 1A, 1B & 1C are exemplary embodiments of the ECITAC card 100. ECITAC card 100 is a functional component of the system disclosed herein, which includes an electronic data card 102 configured for storing thereon any one or more of the following: a biometric identifier 104, travel itinerary 106, security clearance 108 and/or data structures 200. ECITAC card 100 is selected from the group of electronic devices consisting essentially of programmable smart cards, memory cards, and processor cards, with at least one memory means 110 embedded therein configured for storing any one or more of the following: a biometric identifier 104 and/or the ECITAC card holder's travel itinerary 106 and/or security clearance 108. Travel itinerary 106 may include but is not limited to: surname, given names, card holder's picture, personal contact information, departing airline carrier, arriving airline carrier, flight information, departing flight number, arriving flight number, departure boarding gate, arrival gate, departing city, arrival city, departure date, arrival date, return date, port of entry, scheduled arrival time, actual arrival time, arrival time at a port of entry, departure time at a port of entry, arrival terminal, departure terminal, current location, flight status notification, passport information and the like. Passport information may include but is not limited to: pre-approved status for visa, photograph, issuing country, passport number, surname, given names, address, nationality, date of birth, place of birth, gender, race, height, color of eyes, passport number, date of issue, passport expiration date, occupation, place of issue, authority or endorsement, contact information, current visa information (if applicable), type of visa and such other passport information that are known and used in the arts.

Prior to the ECITAC card 100 being issued to a card holder, a biometric sample 112 is obtained and enrolled as a biometric identifier 104, which may be stored on the ECITAC card 100 for future reference and comparison. Biometric identifier 104 as used herein describes a biometric sample 112 that uniquely identifies the individual card holder based on his/her intrinsic physical traits, e.g. fingerprints, retina scan, palm geometry, hand geometry, speech, and or other biometric identifiers 104, 104' that are used in the arts.

ECITAC card 100 also includes biometric verification means 114 positioned thereon, where the biometric verification means 114 is configured for validating a card holder's biometric sample 112 by comparing the biometric sample 112 with the biometric identifier 104. Biometric verification means 114 includes but is not limited to: fingerprint recognition means, hand geometry recognition means, palm geometry recognition means, iris recognition means, retina recognition means, speech recognition means and any other biometric verification means 114 that are known and used in the arts. Biometric verification means 114 may include at least one processor 116 positioned within the ECITAC card 100 and disposed in communication with, for example, a fingerprint scanner, hand geometry scanner, a palm geometry scanner, iris scanner, retina scanner, or a user interface which includes an audio receiving circuit capable of receiving audio signals at predetermined frequencies and/or with additional hardware complete with electronic circuitry and such other biometric verification means 114 that are known and used in the arts. Illustratively, as seen in FIG. 1A, the biometric verification means 114 includes a fingerprint scanner, where the ECITAC processor 116 controls the functionality of the fingerprint scanner, generating the varied algorithms for storage of the first valid biometric sample 112 as a biometric identifier 104 and validates the images of subsequent biometric samples 112, 112' received from the ECITAC card holder.

In some embodiments, the ECITAC card 100 may not include a processor 116, while in other embodiments the ECITAC card 100 includes at least one processor 116 positioned within. Processor 116 may be any type of processor 116, such as, but not limited to, a central processing unit (CPU), a microprocessor, a video processor, a front end processor, a coprocessor, a single-core processor, a multi-core processor, as well as any known processor 116 that is used in the arts.

As shown in FIG. 1B, in some embodiments, embedded within the processor 116 are computer executable code 118 readable by the ECITAC card's at least one processor 116 where the computer executable code 118 are operative to perform the varied system functions of the ECITAC card 100. Computer executable code 118 may be any type of computer executable code 118, which may be in the form of a computer program, the program being composed in any suitable programming language or source code, such as C++, C, JAVA, JavaScript, HTML, XML, and other programming languages. The at least one processor 116 positioned within the ECITAC card 100 is configured for performing any one or more of the following: validating a biometric sample 112 with a biometric identifier 104 stored on the ECITAC card's at least one memory means 110; and communicating with a computer via an application program.

In some embodiments, the electronic data card 102 includes at least one memory means 110 as shown in FIG. 1B. Such memory means 110 may include a hardware component, e.g. storage hardware, in electrical communication with at least one processor 116. Storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, the at least one memory means 110 may comprise of both hardware and software components. Memory means 110 may include any one or more of the following stored thereon: biometric identifier 104, security clearance 108, travel itinerary 106, and/or data structures. In some embodiments, at least one memory means 110 may be embedded within at least one processor 116 where the information stored therein is encrypted for privacy purposes. In other embodiments, the at least one memory means 110 is adapted with electrical contacts for establishing wired and/or wireless connectivity with external devices, e.g. a computer and the at least one memory means 110, for retaining and securing the biometric identifier 104, security clearance 108 and or other components of the data structures 200 stored thereon, via for example a microchip and/or at least one microprocessor 116 where the memory means 110 is embedded within.

In some embodiments, ECITAC card 100 may optionally include a battery 120 (not shown), which serves as a power source for the at least one processor 116 positioned therein. In some embodiments, ECITAC card 100 is adapted with electrical contacts 122 for establishing wired and/or wireless connectivity to a charger, e.g. a docking station, and as such may not include a battery 120 (not shown). In that event, processor 116 detects when the ECITAC card 100 has been disconnected from an external power source and switches ECITAC card 100's power source to an internal power source, such as the battery 120 (not shown).

FIG. 1C is an exemplary embodiment of the ECITAC card 100. In some embodiments, ECITAC card 100 may include an ECITAC card number 124, which acts as a unique identifier for the ECITAC card 100 and/or card holder. ECITAC card number 124 may be assigned via a random number generating program, comprising of numerals, characters, alphanumeric characters or any other unique identifiers that are known and used in the arts. Prior to the ECITAC card 100 being issued to the card holder, the ECITAC card number 124 may be recorded as another means of identifying the ECITAC card holder. ECITAC card 100 may also include other indicia of identification, e.g. the ECITAC card holder's name 126. In some embodiments, the card holder's address may also be printed on the ECITAC card's exterior and/or stored within the ECITAC card's memory means 110.

The ECITAC card holder's identity may also be verified to the appropriate authorities using the biometric verification means 114 stored thereon. For example, in instances where the biometric verification means 114 includes a fingerprint scanner as shown in FIG. 1C, the ECITAC card holder may submit a biometric sample 112 using the same finger previously used to obtain the first valid biometric sample 112 stored thereon as the biometric identifier 104. If the biometric sample 112 matches the biometric identifier 104, the ECITAC card's at least one processor 116 disposed in communication with the fingerprint scanner, may activate the ECITAC card's displaying means 128, which may include a Light Emitting Diode ("LED") display to show for example a green light on the ECITAC card 100, and a red light if the biometric sample 112 fails to match the biometric identifier 104 stored thereon. It is understood that different color schemes may be used in other embodiments to indicate whether the biometric sample 112 matches or fails to match the biometric identifier 104.

Figure 2:
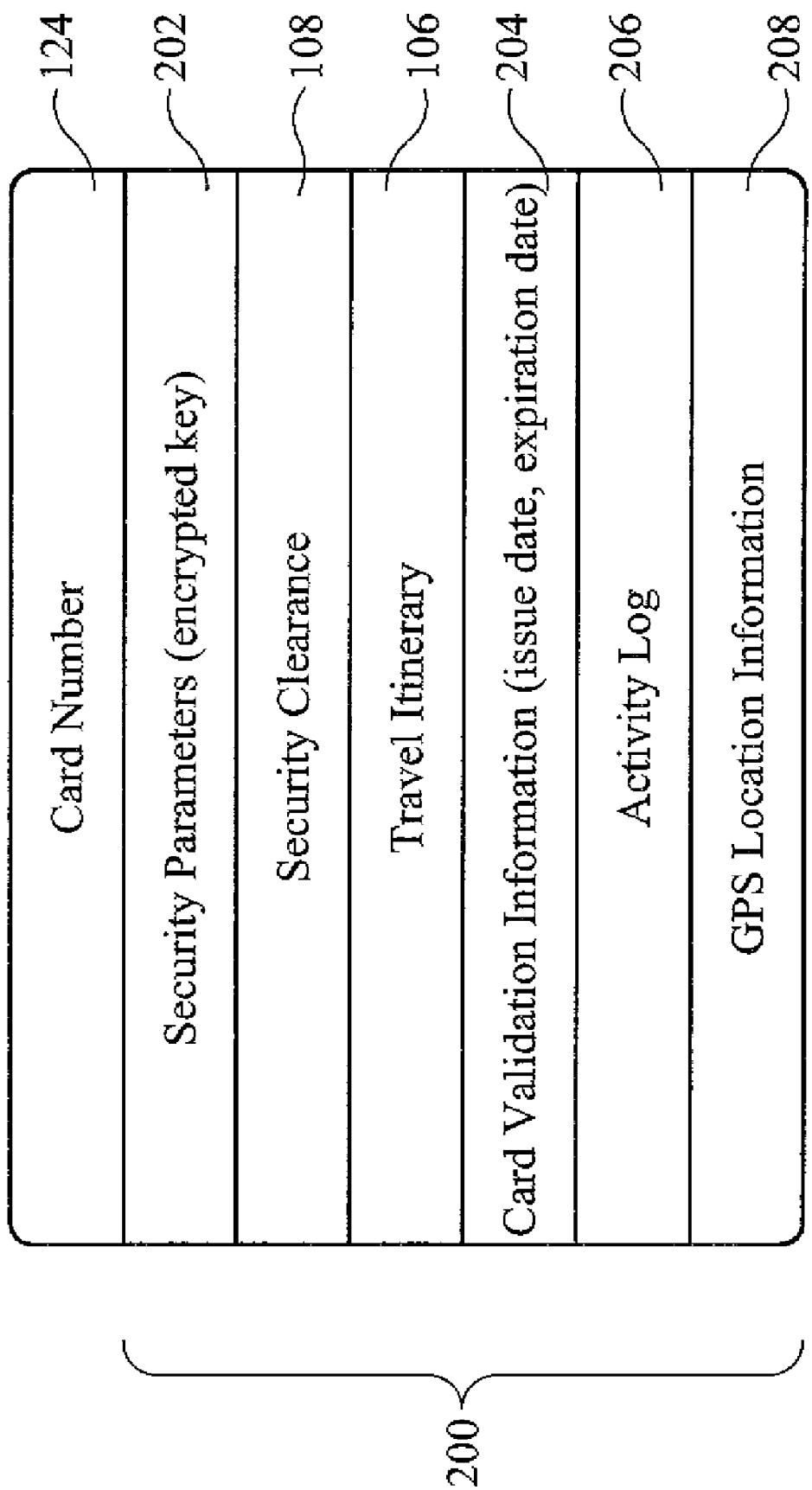
FIG. 2 illustrates, by way of example, collectively the data structures stored within an embodiment of the ECITAC card.

FIG. 2 illustrates, by way of example, collectively the data structures 200 stored within an embodiment of the ECITAC card 100. Data structures 200 are retained within the electronic data card's memory means 110, which preferably provides sufficient processing resources to facilitate communication and maintain adequate security for the card. Data structures 200 may include but is not limited to: card number 124, security parameters 202, security clearance 108, travel itinerary 106, card validation information 204, activity log 206 and Global Positioning System ("GPS") location information 208. Card number 124 may act as a unique identifier allowing the system to uniquely recognize and track each ECITAC card 100 that has been assigned and issued to individual card holders. Security parameters 202 may be provided that may include an encrypted key(s) of military grade, and or security codes, biometric security features, and/or other security mechanisms for securing the information stored on the ECITAC card's memory means 110.

Security clearance 108 includes the clearance status granted to the card holder for travel indicating whether the card holder is pre-approved for expedited security screening when travelling through a country's port of entry and/or if not, then why. In some embodiments, there are different security clearance levels that may be assigned to an ECITAC card holder for which different security protocols will be applied, e.g. diplomatic status, business traveler, and the like. Prior to receiving the ECITAC card 100, the card holder may be required to undergo background and security check(s), for which a security clearance 108 status is conferred to the card holder for travel within a predetermined period of time. In this manner, security personnel can readily determine the card holder's status for pre-approved expedited security screening and follow the appropriate protocol for the ECITAC card holder's security clearance 108.

Travel itinerary 106 may include but is not limited to: surname, given names, card holder's picture, personal contact information, departing airline carrier, arriving airline carrier, flight information, departing flight number, arriving flight number, departure boarding gate, arrival gate, departing city, arrival city, departure date, arrival date, return date, port of entry, scheduled arrival time, actual arrival time, arrival time at a port of entry, departure time at a port of entry, arrival terminal, departure terminal, current location, flight status notification, passport information and the like.

Card validation information 204 may include for example the ECITAC card's 100 issue date that corresponds to the date the ECITAC card 100 was issued to the card holder, and/or card expiration date for the card holder's security clearance 108. Upon expiration of the security clearance 108, the card holder may be required to undergo background and security checks, which may or may not be as extensive as the initial background and security checks for first obtaining an ECITAC card 100. Activity log 206 may optionally contain a record of all uses of the ECITAC card 100, i.e. logging the airports or other ports of entry for which the ECITAC card 100 was presented as a means of identifying card holder's pre-authorized security clearance 108 status for travel, or scanned upon card holder's arrival or departure at a port of entry.

In some embodiments, the ECITAC card 100 may include GPS location determining means 210 (not shown), e.g. a GPS transponder, for determining the location of the ECITAC card 100 with means for encoding 212 (not shown) the location into an electronic signal 214 (not shown) using e.g. a processor 116, e.g. a microprocessor, which is transmitted to an authorized institution 216 (not shown) where the transmitted electronic signal 214 (not shown) is decoded and the location of the ECITAC card 100 or use activity may be monitored in real-time. As such, the location of the ECITAC card 100 as well as the ECITAC card holder may be determined in real-time via global satellite system, where the information, i.e. the longitude and latitude coordinates, may be stored in the GPS location information 208.

Figure 3A:
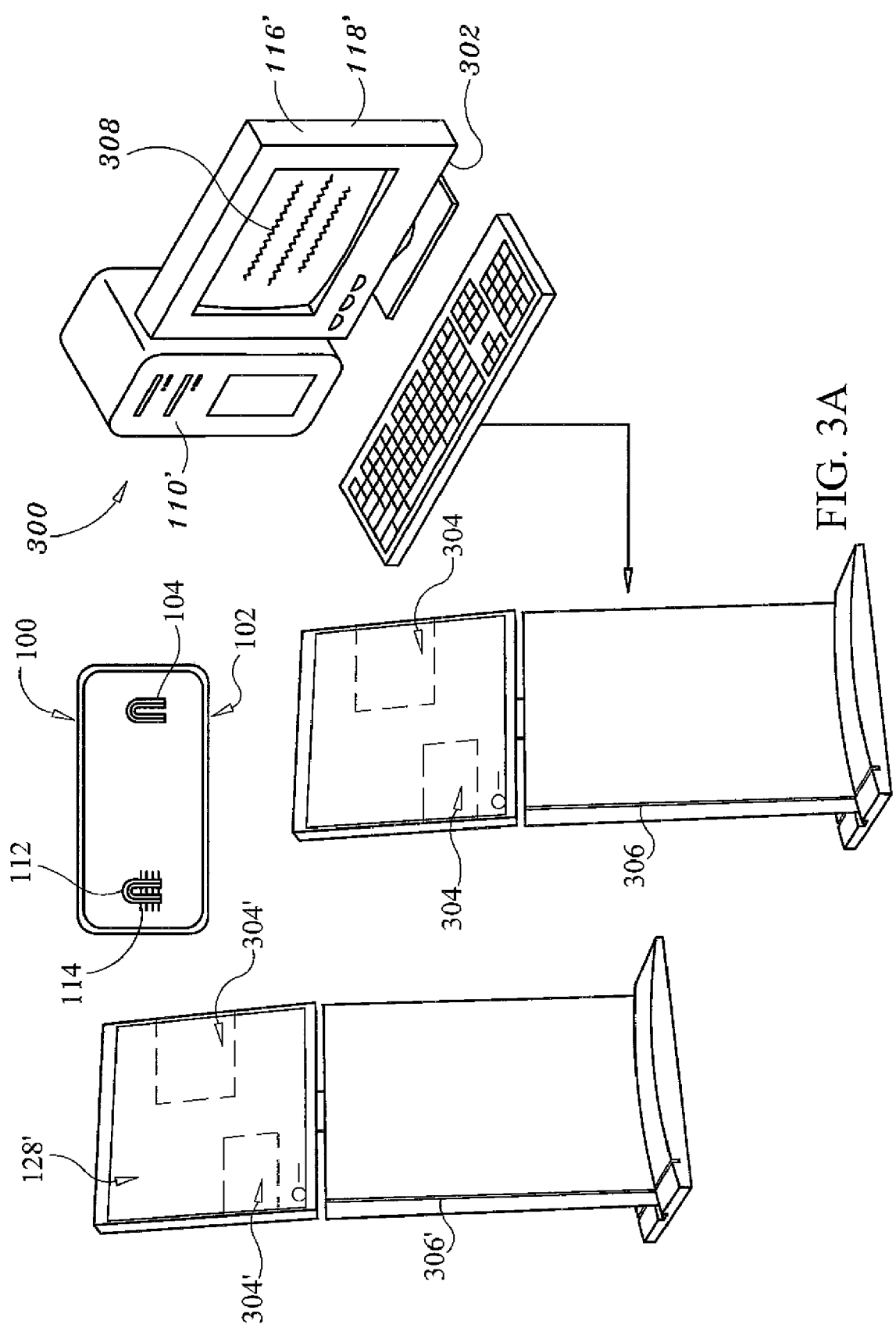
FIG. 3A is an illustrative diagram of an exemplary embodiment of the system.

FIG. 3A is an illustrative diagram of an exemplary embodiment of the system 300. System 300 comprises of a computer 302; an ECITAC card 100, which includes an electronic data card 102 configured for electronically storing thereon at least one card holder's travel itinerary 106, card holder's security clearance 108, a biometric identifier 104, and/or other components of data structures 200; and a card reader 304 connected to the computer 302, wherein the card reader 304 is configured for reading and receiving at least one card holder's travel itinerary 106 or security clearance 108 electronically stored on the electronic data card 102. Electronic data card 102 communicates with a card reader 304 or the computer 302 in any one of the following manner: wirelessly or wired.

ECITAC card 100 is selected from the group of electronic devices consisting essentially of programmable smart cards, memory cards, and processor cards, with at least one memory means 110 embedded therein configured for storing any one or more of the following: a biometric identifier 104, the ECITAC card holder's travel itinerary 106 and/or security clearance 108. As previously discussed, travel itinerary 106 may include but is not limited to: surname, given names, card holder's picture, personal contact information, departing airline carrier, arriving airline carrier, flight information, departing flight number, arriving flight number, departure boarding gate, arrival gate, departing city, arrival city, departure date, arrival date, return date, port of entry, scheduled arrival time, actual arrival time, arrival time at a port of entry, departure time at a port of entry, arrival terminal, departure terminal, current location, flight status notification, passport information and the like.

ECITAC card 100 includes an electronic data card 102 configured for receiving a first valid biometric sample 112 where it is stored thereon as a biometric identifier 104 uniquely identifying the card holder based on his/her intrinsic physical traits, e.g. fingerprints, retina scan, palm geometry, hand geometry, speech, and or other biometric identifiers 112 that are used in the arts. In this manner, the ECTIAC card 100 is rendered useless if stolen as the ECITAC card 100 cannot be used to identify anyone other than the individual card holder to whom the ECITAC card 100 was issued. ECITAC card holder's identity may be further verified, e.g. in the presence of authorities at the port of entry's screening point, where card holder may be required to submit an in-person biometric sample 112 for comparison with the biometric identifier 104 electronically stored on the ECITAC card 100.

In some embodiments, system 300 also comprises of biometric verification means 114 which may include at least one processor 116 positioned within the ECITAC card 100, where the biometric verification means 114 is configured for validating a biometric sample 112 by comparing the biometric sample 112 with the biometric identifier 104 stored thereon. Biometric verification means 114 includes but is not limited to: fingerprint recognition means, hand geometry recognition means, palm geometry recognition means, iris recognition means, retina recognition means, speech recognition means and any other biometric verification means 114 that are known and used in the arts. ECITAC processor 116 may be disposed in communication with, for example, a fingerprint scanner, hand geometry scanner, a palm geometry scanner, iris scanner, retina scanner, or a user interface which includes an audio receiving circuit capable of receiving audio signals at predetermined frequencies and/or with additional hardware complete with electronic circuitry and such other biometric verification means 114 that are known and used in the arts. Biometric verification means 114 may include a fingerprint scanner, where the ECITAC processor 116 controls the functionality of the fingerprint scanner, generating the varied algorithms for storage of the first valid biometric sample 112 as a biometric identifier 104 and validates the images of subsequent biometric samples 112, 112' received from the ECITAC card holder.

Card reader 304 describes a device for reading/writing and/or receiving the information electronically stored on the ECITAC card 100, which includes but is not limited to any one or more of the following: the ECITAC card number 124, a biometric identifier 104, card holder's travel itinerary 106, security clearance 108 and/or any other component of the data structures 200 stored thereon. Card reader 304 can be connected to a computer 302 and may be adapted with electrical contacts 122 for establishing either wired or wirelessly connectivity to ECITAC cards 100, 100', 100" and/or the computer 302. A wireless connection may be established, wherein communication access is established in response to proximity or manual activation of the card reader 304. Accordingly, a card holder's ECITAC card 100 may be read wirelessly if the ECITAC card 100 is within a close enough proximity to the card reader 304 to be read wirelessly without any physical contact. Card reader 304 may also be integrated within a computer 302 (e.g. with a slot for wired card connectivity), an external device (e.g., USB connection to a small housing), or be integrated into other devices, e.g. a self-serve kiosk 306 that are well known and used in the arts.

In some embodiments system 300 further comprises of at least one or more kiosks 306, 306'. Kiosks 306, 306' are open, electronic, computerized booths, which in some embodiments are adapted to include at least one or more card readers 304, 304'. Stand alone card readers 304, 304' and/or kiosks 306, 306' may be strategically located throughout security checkpoints within for example an airport for ease of processing the volume of travelers. As such, ECITAC card 100 may be swiped at any self-serve kiosk 306 at the port of entry, informing security personnel of the ECITAC card holder's security clearance status 108 where the card holder may be pre-approved for expedited security clearance 108 for travel. Kiosks 306, 306' as used herein may include touch screens, trackballs, computer keyboards, pushbuttons and the like. In some embodiments, kiosks 306, 306' may be adapted to include biometric verification means 114 positioned thereon for authenticating at least one electronic data card holder's identity.

Kiosks 306, 306' may also include displaying means 128' in electrical communication with a processor 116' for activating the kiosk's displaying means 128' for displaying select travel itinerary 106 information stored on the ECITAC card 100 as read by the card reader 304, e.g. card holder's picture and departing city, date and flight information. Kiosk's displaying means 128' may include: a liquid crystal display ("LCD") screen, a light emitting diode ("LED") screen, or a monitor and the like. In some embodiments, kiosk's displaying means 128' are electrically connected to processor 116, while in other embodiments, displaying means 128' are wirelessly connected to processor 116. In yet further embodiments, displaying means 128' may include a control means, such as, but not limited to, a keyboard, a mouse, a touch screen, a stylus, and the like. In either event, processor 116' may activate displaying means 128' (not shown) such that card holder's select travel itinerary information 106 may be displayed.

For example, in some embodiments a departing airline passenger may be required to authenticate his/her identity prior to receiving the privilege of expedited security screening. The airline passenger may be required to first submit a biometric sample 112 via biometric verification means 114 positioned either on the ECITAC card 100 or the kiosk 306, which will be verified against the biometric identifier 104 electronically stored on the ECITAC card 100. Kiosk's displaying means 128' may be activated to display select card holder's travel itinerary, e.g. card holder's photograph, surname, given names, and the like. If the biometric sample 112 matches the biometric identifier 104 and/or the card holder's identity can be confirmed with a visual comparison of the card holder based on the select travel itinerary 106 displayed by the kiosks displaying means 128', then the ECITAC card holder will be cleared for expedited security screening based on his/her security clearance 108. If however, the biometric sample 112 differs from the biometric identifier 104 after successive attempts, security protocol may require detention of the card holder or at least further inquiry.

Illustratively, in yet another embodiment, ECITAC card holder's travel itinerary 106 may be transmitted to the appropriate authorities prior to the passenger arriving at his/her port of final destination. For example, an ECITAC card holder travelling from London, England to Kansas City, United States of America ("United States"), i.e. the port of final destination, with a flight connection in New York necessarily must clear immigration and customs at the first port of entry in the United States, i.e. New York. Upon arrival in New York, card holder's ECITAC card 100 may be read by a card reader 304 (wired or wirelessly) strategically placed en route to immigration and customs, where the ECITAC card 100 information will be read and his/her travel itinerary 106 and security clearance 108 are transmitted ahead to immigration and custom authorities placing them on notice of the card holder's security clearance 108 for expedited security screening. Card holder's travel itinerary 106 may also be forwarded to the authorities in Kansas City such that if there are any unexplainable discrepancies between the expected arrival times and the actual arrival time, the authorities are alerted early enough to take any necessary steps to investigate and/or act further.

Figure 3B:
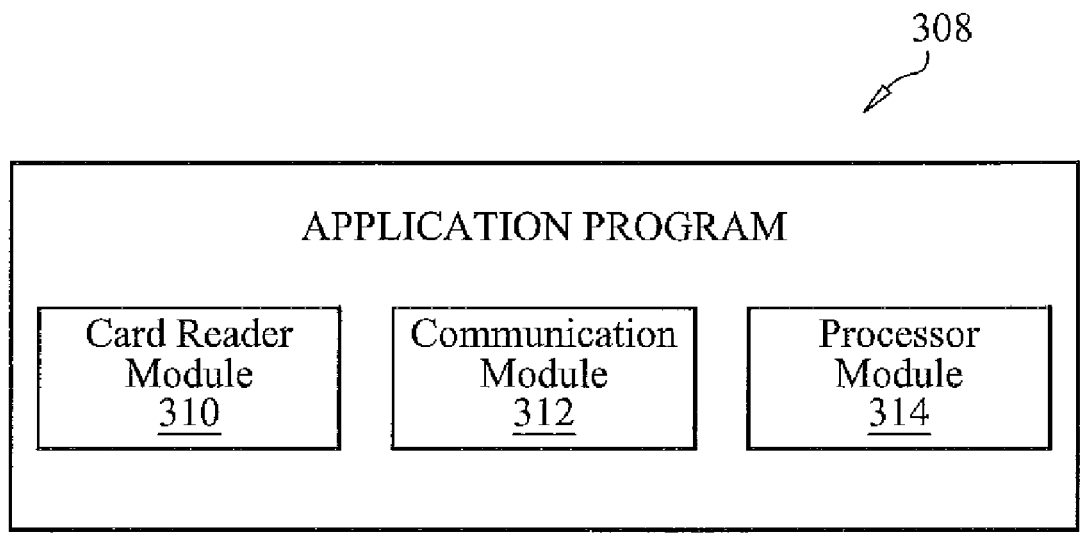
FIG. 3B is an illustrative diagram of an exemplary embodiment of the system according to one embodiment.

Computer 302, e.g. a network enabled computer 302, i.e. a laptop or personal digital assistant subject to wired/wireless connectivity. System 300 may include software components, comprising of an application program 308 executable on the computer 302, where application program 308 is configured for facilitating communications between the ECITAC card 100 and the computer 302 through the card reader 304. ECITAC card is 100 is configured for being accessed by the application program 308 executable on the computer 302, where the application program 308 accesses the biometric identifier 104, travel itinerary 106 and/or security clearance 108 stored thereon in the ECITAC card's memory means 110. Application program 308 may comprise in part of a browser, such as for use on a personal computer 302 or similar browsing device. Illustratively as seen in FIG. 3B, application program 308 may include at least one or more system modules, e.g. a card reader module 310 for reading the ECITAC card 100, a communications module 312 for establishing communications between computer 302 and the ECITAC card 100 through the card reader 304 and for transmitting card holder's travel itinerary 106 to another port of entry; and a processor module 314 for communicating with and/or controlling one or more processors 116, 116".

Computer 302 includes at least one processor 116", which may be any type of processor 116", such as a central processing unit (CPU), a microprocessor, a front end processor, a coprocessor, a single-core processor, a multi-core processor, as well as any known processor that's used in the arts. Computer's at least one processor 116" includes computer executable code 118' executable by the computer's at least one processor 116", and operative to perform the varied system 300 and methods disclosed herein. Computer executable code 118' may be loaded directly on the computer's processor 116", or may be stored in computer's' memory means 110', such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer executable code 118' may be any type of computer executable code 118', which may be in the form of a computer program, the program being composed in any suitable programming language or source code, such as C++, C, JAVA, JavaScript, HTML, XML, and other programming languages.

In some embodiments, system 300 includes a card reader 304 connected to the computer 302, wherein the card reader 304 is configured for receiving at least one card holder's travel itinerary 106 or security clearance 108 electronically stored on the electronic data card 102; computer executable code 118' executable on the computer 302 are operative to perform any one or more of the following: controlling the card reader 304 to read the electronic data card 102; receiving a biometric sample 112 used to verify the identity of the card holder; verifying the card holder's biometric sample 112 with the biometric identifier 104; reviewing a card holder's security clearance 108 to determine the electronic data card holder's pre-approval status for expedited security screening; activating a kiosk's displaying means 128'; transmitting at least one travel itinerary 106 to another port of entry; extending an electronic data card's 100 validation based on receiving a card holder's select travel itinerary 106, e.g. contact information; or suspending an electronic data card's 100 validation based on failing to receive a card holder's select travel itinerary 106, e.g. contact information.

As shown in FIG. 3A, computer 302 is disposed in communication with memory means 110', i.e. illustratively an electronic database, configured for storing and maintaining information for at least one ECITAC card 100 for at least one ECITAC card holder. Memory means 110' may include a hardware component, e.g. storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, memory means 110' may include a software component, such as, but not limited to, an electronic database as illustrated in FIG. 3A, file management software, and any other software component as used in the arts. In yet another embodiment, memory means 110 may comprise of both hardware and software components.

Methods

The system 300 and methods 400 disclosed herein may be used for domestic or international travel.

Figure 4:
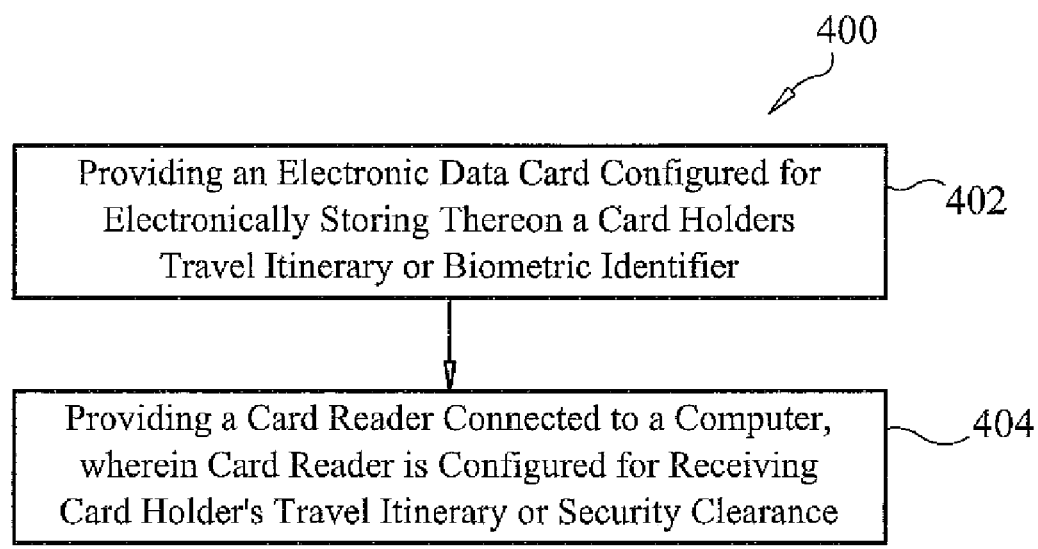
FIG. 4 is a sample flowchart of an exemplary method of processing an ECITAC card holder who has been pre-approved for expedited security screening according to one embodiment.

FIG. 4 is a sample flowchart of an exemplary method 400 of processing an ECITAC card holder who has been pre-approved for expedited security screening according to one embodiment. Method 400 comprises of providing an electronic data card 102 configured for electronically storing thereon a card holder's travel itinerary 106, biometric identifier 104 and/or security clearance 108 (step 402); and providing a card reader 304 connected to a computer 302, wherein the card reader 304 is configured for reading and receiving the card holder's travel itinerary 106 or security clearance 108 stored on the electronic data card 102 (step 404). Electronic data card 102 may communicate with the card reader 304 or the computer 302 in any one of the following manner: wired or wirelessly.

Card reader 304 describes a device for reading/writing and/or receiving the information electronically stored on the ECITAC card 100, which includes but is not limited to any one or more of the following: the ECITAC card number 124, a biometric identifier 104, card holder's travel itinerary 106, security clearance 108 and/or any other component of the data structures 200 stored thereon. Card reader 304 can be connected to a computer 302 and may be adapted with electrical contacts 122 for establishing either wired or wirelessly connectivity to ECITAC cards 100, 100', 100" and/or the computer 302. Computer 302 includes e.g. a network enabled computer 302, i.e. a laptop or personal digital assistant subject to wired/wireless connectivity as described in much detail above.

Travel itinerary 106 may include but is not limited to: surname, given names, card holder's picture, personal contact information, departing airline carrier, arriving airline carrier, flight information, departing flight number, arriving flight number, departure boarding gate, arrival gate, departing city, arrival city, departure date, arrival date, return date, port of entry, scheduled arrival time, actual arrival time, arrival time at a port of entry, departure time at a port of entry, arrival terminal, departure terminal, current location, flight status notification, passport information and the like. Passport information may include but is not limited to: pre-approved status for visa, photograph, issuing country, passport number, surname, given names, address, nationality, date of birth, place of birth, gender, race, height, color of eyes, passport number, date of issue, passport expiration date, occupation, place of issue, authority or endorsement, contact information, current visa information (if applicable), type of visa and such other passport information that are known and used in the arts.

Method 400 may further include providing biometric verification means 114 (step 406, not shown) positioned within the electronic data card 102 or a kiosk 306 adapted to include such biometric verification means 114. In either event, the biometric verification means 114 is configured for validating a biometric sample 112 by comparing the biometric sample 112 with the biometric identifier 104 stored thereon. Biometric verification means 114 includes but is not limited to: fingerprint recognition means, hand geometry recognition means, palm geometry recognition means, iris recognition means, retina recognition means, and speech recognition means as described in further detail above.

Figure 5:
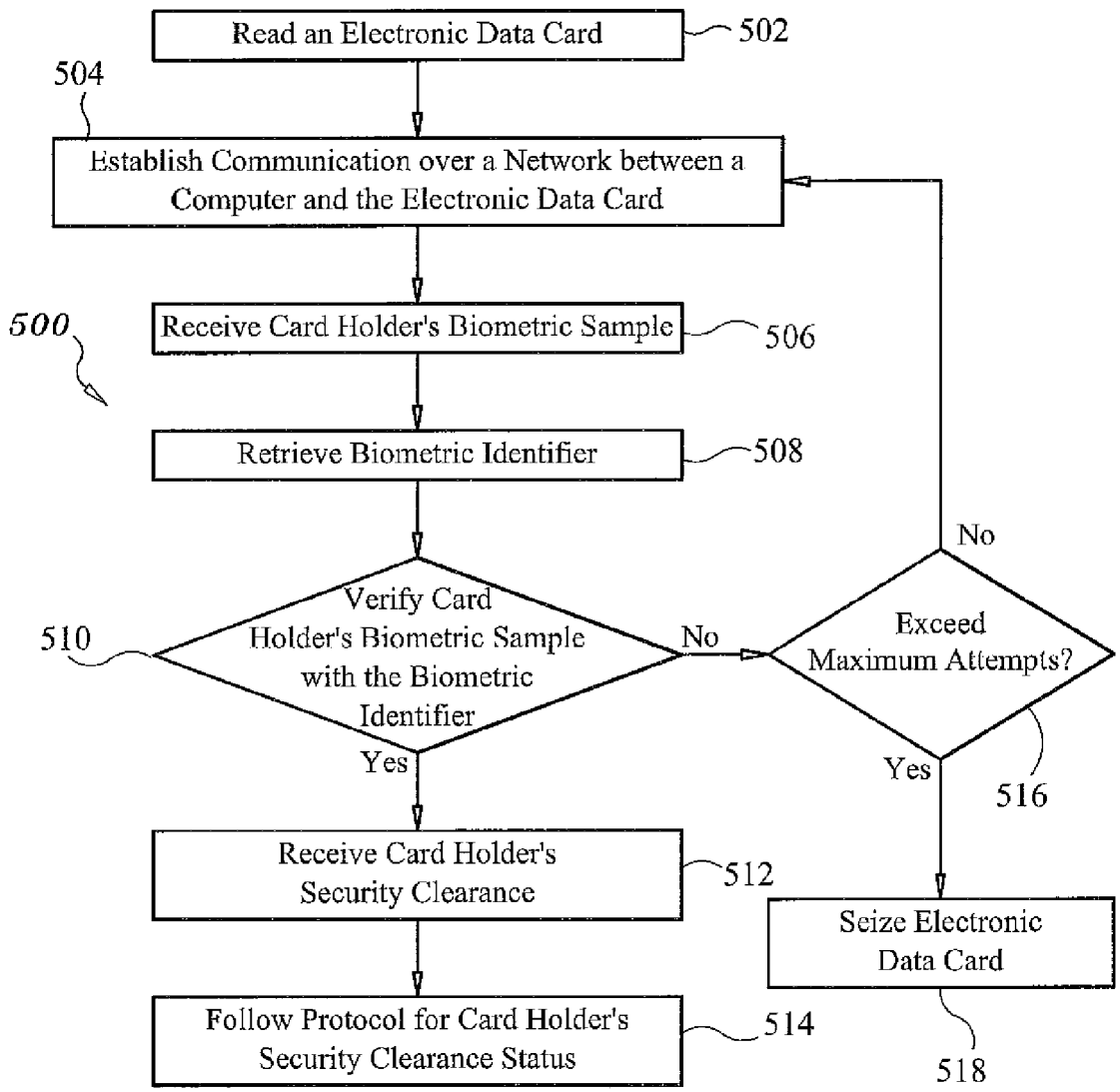
FIG. 5 is a sample flowchart of an exemplary method of processing an ECITAC card holder who has been pre-approved for expedited security screening according to another embodiment.

FIG. 5 is a sample flowchart of an exemplary method 500 of processing an ECITAC card holder who has been pre-approved for expedited security screening according to another embodiment. Method 500 comprises reading an electronic data card 102 (step 502), which includes for example the card holder's biometric identifier 104, travel itinerary 106 and/or security clearance 108 electronically stored thereon. A kiosk 306 adapted to include at least one card reader 304 or a standalone card reader(s) 304, 304' may be provided (step 503, not shown) at strategically located security checkpoints at the port of entry for the electronic data card 102 to be read. If the electronic data card 102 is within a predetermined radius for being read wirelessly, the card reader 304 may read the ECITAC card 100 without making physical contact with the card. Alternatively, the ECITAC card 100 may be swiped at the card reader 304, which reads the information electronically stored thereon. Card reader 304 is configured with an application program 308' which may include a communications module 312 for establishing wired or wireless communications over a network between a computer 302 and the electronic data card 102 (step 504) and for transmitting information stored on the ECITAC card 100, such that the ECITAC card's 100 information can be accessed and readily transmitted to the computer 302 for further processing.

Application program 308 may also comprise in part of a browser, such as for use on a personal computer 302 or similar browsing device and may include at least one or more system modules, e.g. a card reader module 310 for reading the ECITAC card 100, a communications module 312 for establishing communications between computer 302 and the ECITAC card 100 through the card reader 304; and a processor module 314 for communicating with and/or controlling one or more processors 116, 116", e.g. the ECITAC card's processor 116.

In some embodiments, kiosk 306 may be adapted to include biometric verification means 114 positioned thereon for authenticating at least one electronic data card holder's identity. Biometric verification means 114 are configured for receiving at least one card holder's biometric sample 112 (step 506) for verification with the biometric identifier 104 stored on the ECITAC card 100. Application program 308 may include a card reader module 310, which reads the ECITAC card 100, where the application program's processor module 314 communicates with the ECITAC card's processor 116 so that the biometric identifier 104 may be retrieved (step 508) for comparison with the biometric sample 112, where the biometric sample 112 is verified with the biometric identifier 104 (step 510) confirming the identity of the card holder. If the biometric sample 112 matches the biometric identifier 104 card holder's security clearance 108 is received (step 512) and method 500 may follow protocol for security screening (step 514) based on card holder's security clearance 108.

If however, the biometric identifier 104 failed to match the biometric sample 112 (step 510), and the card holder has not yet exceeded the maximum attempts (step 516) permitted for submitting new biometric samples 112, 112' then card holder may be prompted to resubmit a biometric sample 112, where it is received (step 506) and method 500 will return to steps 508-516, until a valid biometric sample 112 is submitted or card holder has exceeded the maximum number of attempts allowed (step 516). In that event, card reader 304 may be programmed to seize the electronic data card 102 (step 518).

Figure 6:
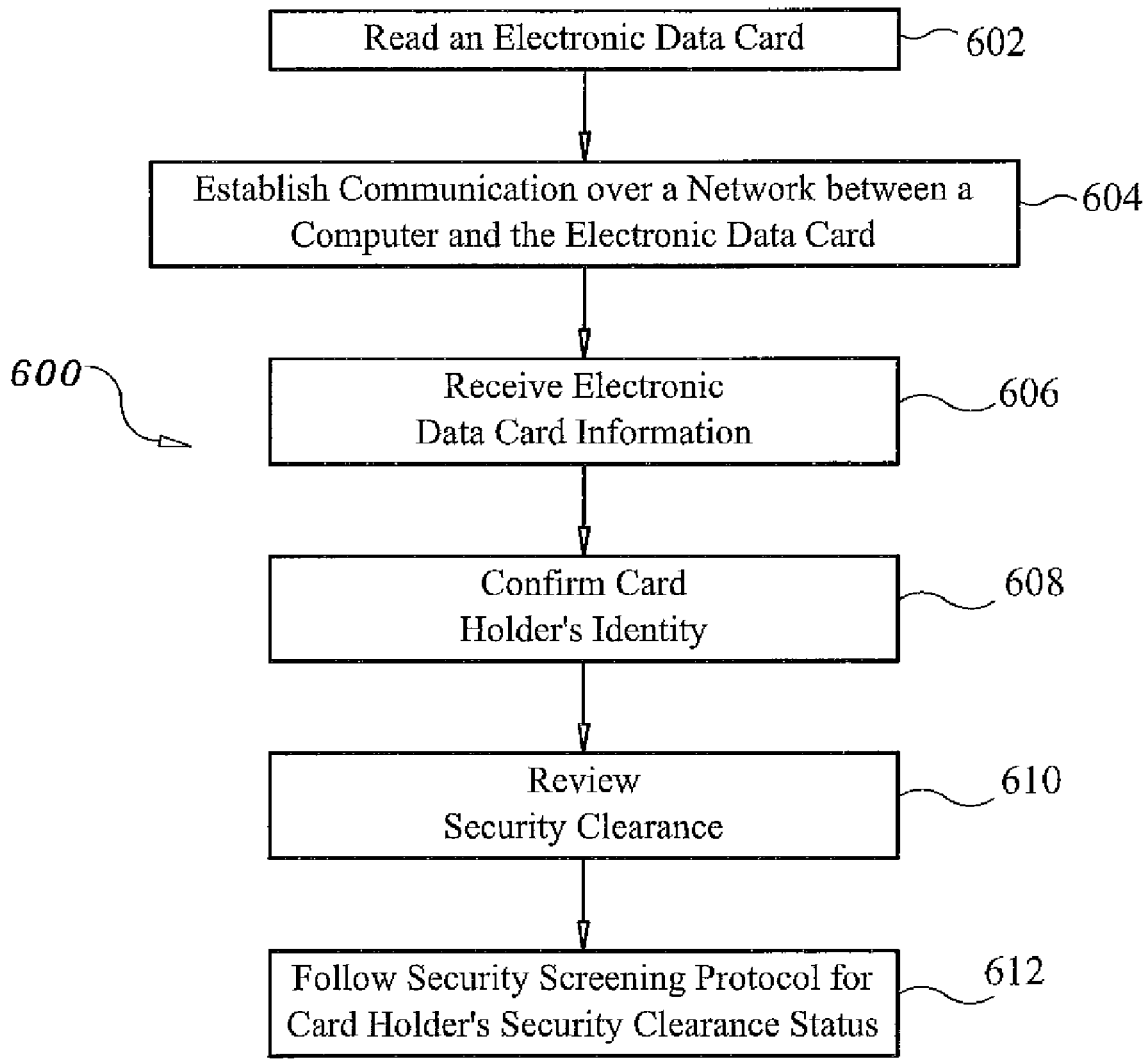
FIG. 6 is a sample flowchart of an exemplary method of processing an ECITAC card holder pre-approved for expedited security screening according an alternate embodiment.

FIG. 6 is a sample flowchart of an exemplary method 600 of processing an ECITAC card holder pre-approved for expedited security screening according an alternate embodiment. Method 600 comprises reading an electronic data card 102 (step 602), and establishing wired or wireless communications over a network between a computer 302 and the electronic data card 102 (step 604) in the identical manner as described in steps 502-504 of FIG. 5. However, in this exemplary embodiment, ECITAC card 100 may be read wirelessly and as such card holder may not be required to submit a biometric sample 112 for verification.

Nonetheless, application program 308 accesses the ECITAC card 100 and receives the electronic data card information (step 606) stored thereon, e.g. travel itinerary 106, security clearance 108 and/or biometric identifier 104. Computer's processor 116" communicates with the kiosk's processor 116' to activate the kiosk's displaying means 128' (step 608) for displaying select travel itinerary 106 and or security clearance 108 thereon. As such, kiosk 306 displays select travel itinerary information (step 610), e.g. e.g. card holder's photograph, surname, given names, and the like, which may be used for visual comparison with the ECITAC card holder. Based on the display, the card holder's identity may be confirmed (step 612) either visually or other electronically using other identity verification means. Method 600 further comprises reviewing card holder's security clearance 108 (step 614), wherein card holder's security screening will be based on following security screening protocol according to card holder's security clearance 108 (step 616).

Figure 7:
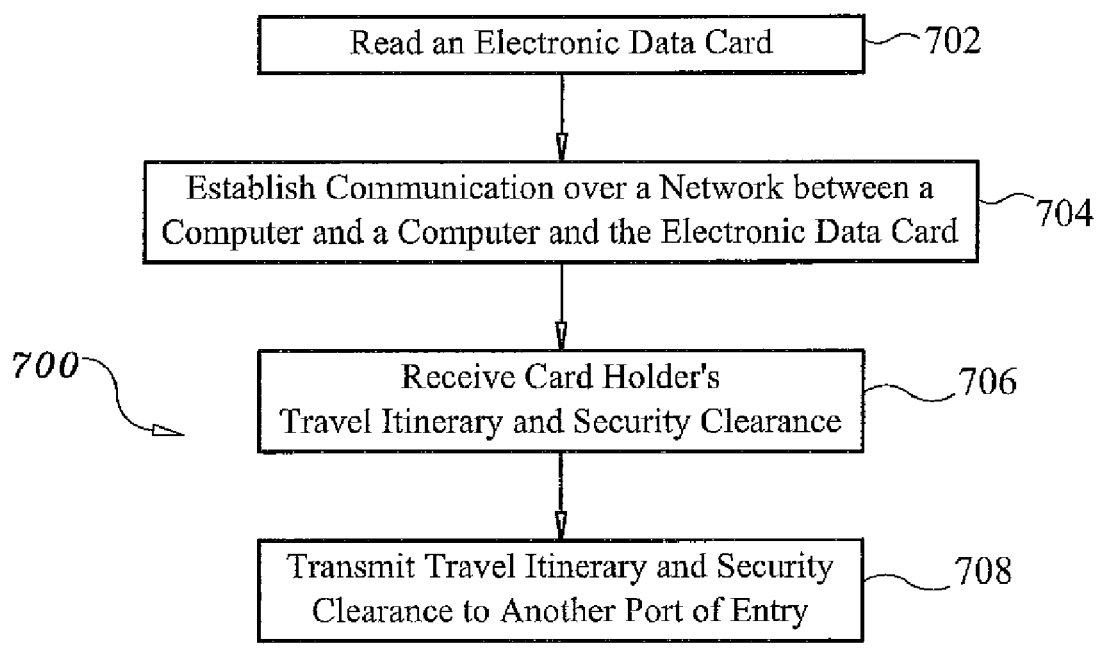
FIG. 7 is a sample flowchart of an exemplary method of forwarding an ECITAC card holder's security clearance status to another port of entry according to one embodiment.

FIG. 7 is a sample flowchart of an exemplary method 700 of forwarding an ECITAC card holder's security clearance status 108 to another port of entry according to one embodiment. Method 700 comprises reading an electronic data card 102 (step 702), and establishing wired or wireless communications over a network between a computer 302 and the electronic data card 102 (step 704) in the identical manner as described in steps 502-504 and steps 602-604 of FIGS. 5 & 6, respectively.

Card reader 304 which includes the application program's card reader module 310 reads and receives card holder's travel itinerary 106 and security clearance 108 (step 706) stored on the ECITAC card 100. Once received, computer executable code 118' transmits the card holder's travel itinerary 106 and/or security clearance 108 (step 708) to another port of entry, e.g. a port of final destination, such that the relevant authorities can be apprised of card holder's security clearance 108 status, e.g. business traveler qualifying for expedited security screening. Travel itinerary 106 may also be transmitted ahead to the appropriate authorities for further determination if necessary of any discrepancies between the travel itinerary 106 and the card holder's current port of entry location.

Figure 8:
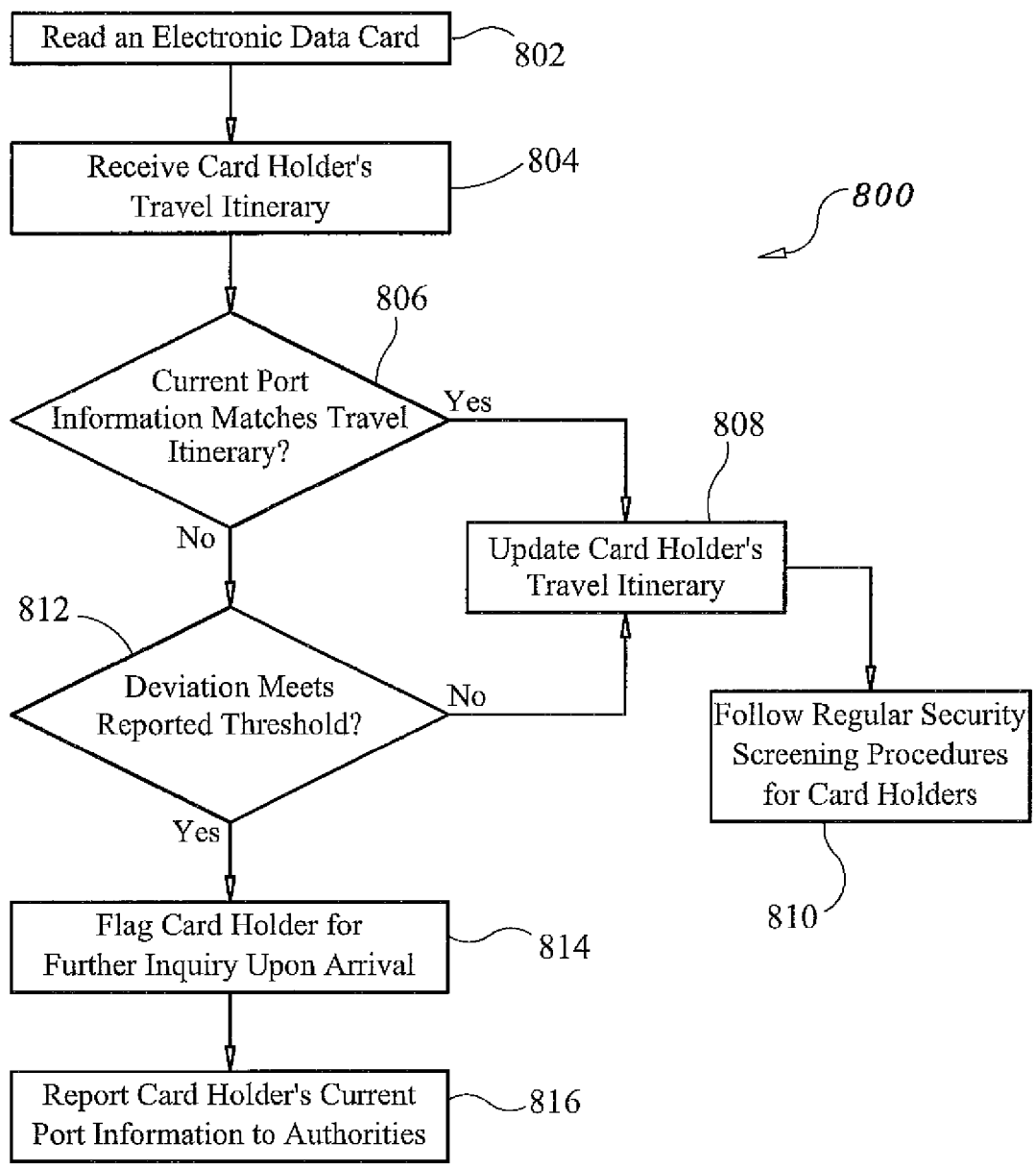
FIG. 8 is a sample flowchart of an exemplary method of providing an early alert of unexplained discrepancies between a card holder's travel itinerary and his/her arrival time at a port of entry according to one embodiment.

FIG. 8 is a sample flowchart of an exemplary method 800 of providing an early alert of unexplained discrepancies between a card holder's travel itinerary 106 and his/her arrival time at a port of entry according to one embodiment. Method 800 comprises of reading the ECITAC card 100 (step 802), in the identical manner as described in steps 502-504 and steps 602-604 of FIGS. 5 & 6, respectively. Method 800 further includes receiving card holder's travel itinerary 106 (step 804) for determining whether the current port of entry information matches the card holder's travel itinerary 106 (step 806). Travel itinerary 106 may be obtained wirelessly from a kiosk 306 adapted to include a card reader 304. If the port of entry information matches the travel itinerary 106 then card reader 304 writes to the ECITAC card 100 and updates the card holder's travel itinerary 106 (step 808) such that when the card holder arrives at the next security checkpoint his/her security clearance 108 for expedited security screening is maintained. In that event, method 800 provides for following security screening protocol (step 810) in accordance with card holder's security clearance status 108.

However, if the card holder's current port of entry location information differs from the travel itinerary 106 (step 806), then the level of deviation needs to be determined in order to identify whether or not the card holder is now a flight or travel risk. As such, method 800 determines whether the deviation meets reporting threshold (step 812), e.g. unaccountable delays for arrival time at port of entry warranting further investigation. If there is a large discrepancy between the current port of entry information and the travel itinerary 106 meeting reporting thresholds (step 812), then security protocol may mandate flagging card holder for further inquiry (step 814) upon arrival at the next port of entry and or security checkpoint. Depending on the magnitude of the discrepancy, security protocol may require reporting the card holder's current port information (step 816) and/or the discrepancies to the relevant authorities.

If however, the deviation does not meet reporting threshold (step 810), e.g. delayed arrival at the current port of entry matches reported flight delays, then the card holder's travel itinerary 106 will be updated (step 808) and method 800 provides for following security screening procedures (step 810) in accordance with the card holder's security clearance status 108. Thus, card holder's subsequent arrival at another port of entry, e.g. final port, will reflect the explained delay and the card holder maintains his/her security clearance 108 status, which may qualify for expedited security clearance.

Figure 9:
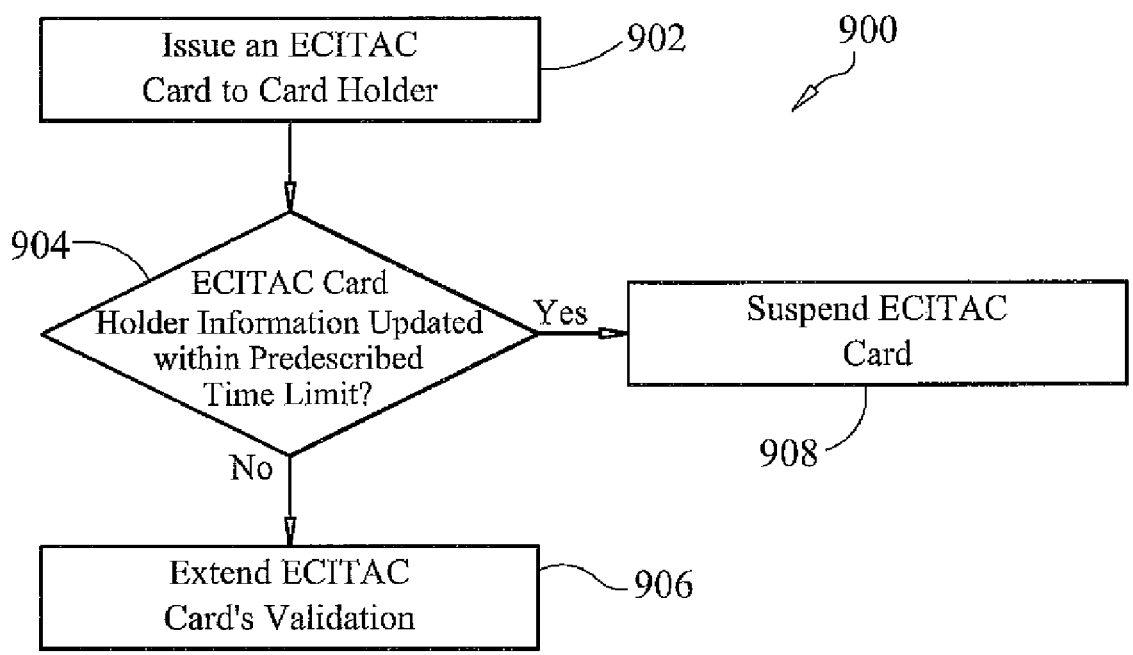
FIG. 9 is a sample flowchart of an exemplary method of updating ECITAC card holder's contact information with the immigration and customs authorities according to one embodiment.

FIG. 9 is a sample flowchart of an exemplary method 900 of updating card holder's contact information with the immigration and customs authorities according to one embodiment. Method 900 includes issuing an ECITAC card 100 to a card holder (step 902) after the card holder has submitted to any necessary background and/or security checks. Each card holder will be required to update his or her contact information via the application program 308 within a prescribed time limit, e.g. 6 months, as failure to do so can invalidate the ECITAC card 100.

If the ECITAC card holder's information is updated within the prescribed time limit, e.g. 6 months (step 904), then method 900 provides for validating ECITAC card 100 (step 906), i.e. flagging the ECITAC card 100 as validly issued. If however, the card holder failed to update his/her contact information within the prescribed time limit (step 904), method 900 provides for suspending the ECITAC card 100 (step 908). In this manner, card holder's have an incentive to update their contact information if they desire to maintain the privilege of expedited security screening when travelling, while the immigration and customs authorities obtain the updated contact information in an expedient and efficient manner.

Hardware and Operating Environment

This section provides an overview of example hardware and the operating environments in conjunction with which embodiments of the inventive subject matter can be implemented.

A software program may be launched from a computer readable medium in a computer-based system 100 to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 10 below.

Figure 10:
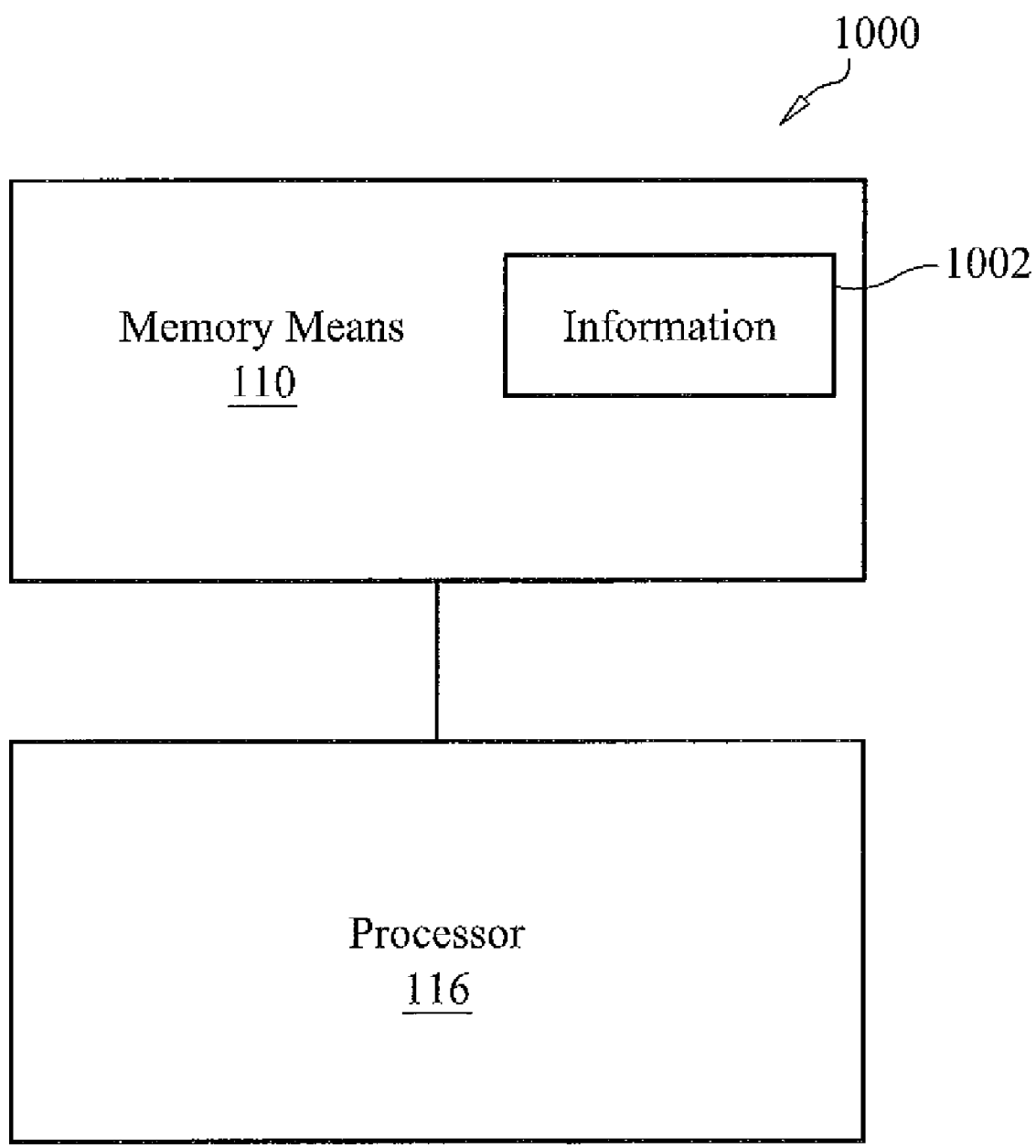
FIG. 10 is a block diagram representing an article according to various embodiments.

FIG. 10 is a block diagram representing an article 1000 according to various embodiments. Such embodiments may comprise a computer 302, a memory system, a magnetic or optical disk, some other storage device, or any type of electronic device or system 100. The article 1000 may include one or more processor(s) 116" coupled to a machine-accessible medium such as a storage means 110' used for storing data in memory (e.g., a memory including electrical, optical, or electromagnetic elements). The medium may contain associated information 1002 (e.g., computer program instructions, data, or both) which, when accessed, results in a machine (e.g., the processor(s) 116") performing the activities previously described herein.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

What is claimed is:

1. A method comprising:
    (a) providing an electronic data card configured for electronically storing thereon a card holder's travel itinerary or a biometric identifier;
    (b) providing a card reader connected to a computer, wherein the card reader is configured for receiving the card holder's travel itinerary or security clearance stored on the electronic data card;
    (c) receiving a biometric sample via biometric verification means positioned on the electronic data card;
    (d) determining if a deviation between the at least one card holder's travel itinerary and a current port of entry meets a reporting threshold; and
    (e) determining card holder's compliance with updating requirements for continued access to expedited security processing.

2. The method of claim 1, further comprising taking action against the electronic data card pursuant to the card holder's compliance with updating requirements.

3. The method of claim 1, further comprising taking any of the following actions: suspending the electronic data card holder's expedited travel privileges for failure to comply with updating requirements; or extending the card holder's expedited travel privileges for a predetermined period of time.

* * * * *